_United States Patent Office_ 3,098,068
Patented July 16, 1963

3,098,068
18-OXYGENATED PREGNANES AND PROCESS FOR THEIR MANUFACTURE
Oskar Jeger, Zurich, Switzerland, assignor to Ciba Corporation, a corporation of Delaware
No Drawing. Filed Dec. 15, 1959, Ser. No. 859,576
Claims priority, application Switzerland Dec. 19, 1958
12 Claims. (Cl. 260—239.5)

The present invention is based on the observation that 18-oxygenated pregnane compounds are obtained in a simple manner by treating a $\Delta^{20 \cdot N}$-18:20-imino-pregnene compound with nitrous acid, and subsequently with an oxidising agent, and, if desired a product thus obtained is converted into a functional derivative thereof.

The above process is represented by the following formula scheme:

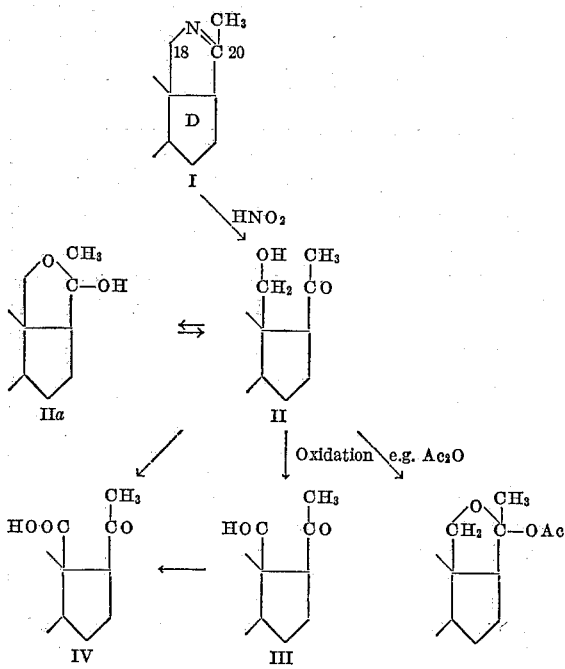

The deamination products obtained by treatment of the starting materials are, accordingly, 18:20-oxido-20-hydroxy-pregnane compounds (IIa) or 18-hydroxy-20-oxo-pregnane compounds (II), which can be converted by oxidation into the 18:20-dioxo-pregnanes (III), or directly or indirectly into the 20-oxo-pregnane-18-acids (IV).

The present process is carried out by dissolving the starting material in an inorganic or organic acid, for example hydrochloric, sulfuric, acetic acid or the like, and treatment with an aqueous solution of an alkali metal nitrite, for example with sodium nitrite. It is of advantage to work at a temperature of about 20° C.

The oxidation of the 18:20-oxido-20-hydroxy-pregnane compounds can be performed with a variety of oxidising agents, such as hexavalent chromium (e.g. chromic acid in glacial acetic acid or pyridine), potassium permanganate, potassium bichromate, cyclohexanone or another ketone in the presence of potassium tertiarybutylate, whereby the corresponding 20-oxo-pregnane-18-aldehydes and/or -18-acids are obtained. The 18-aldehydes can then be oxidized to the 18-acids.

Products of the present process that contain free hydroxyl and/or oxo groups can be converted in as such known manner into their functional derivatives, such as esters, ethers, enol esters, enol ethers, acetals, their corresponding thio derivatives (e.g. thio ethers and esters of thion acids), as well as into hydrazones, oximes and semi-carbazones. Carboxyl groups are, above all, esterified. The residues in the esters, enol esters, ethers, enol ethers, acetals and in the corresponding thio derivatives may belong to the aliphatic, alicyclic, araliphatic, aromatic, or heterocyclic series. The conversion into these derivatives is carried out in as such known manner.

The $\Delta^{20 \cdot N}$-18:20-imino-pregnane compounds, used as starting materials, are new; they belong to the 5α- or 5β-series and may contain in the ring system, above all in positions 3 and 11, substituents such as free or functionally converted hydroxyl or oxo groups, amino (e.g. methylamino) groups, as well as double bonds, for example in positions 1:2, 4:5, 5:6 or 9:11. They are obtained by treating an 18:20-imino-pregnane compound with a halogenating agent, for example chlorosuccinimide, and treating the N-halogeno-compound formed with a base, such as a hydroxide or alcoholate of an alkali or alkaline earth metal; or by introducing the 20:N-double bond by direct dehydrogenation, for example by means of mercury acetate. 18:20-imino-pregnane compounds can be prepared, for example by dealkylation of appropriate N-alkyl-substituted 18:20-imino-pregnane compounds, such as those described in U.S. patent application Serial No. 777,860, filed December 3, 1958, by Leopold Ruzicka et al., or of Holarrhena alkaloids such, for example, as conessine. The degradation of conimine, obtainable from conessine, to $\Delta^4$ - 3 - oxo - 18:20 - oxido - 20 - hydroxy - pregnene or 18-hydroxy-progesterone is represented by the following formula scheme:

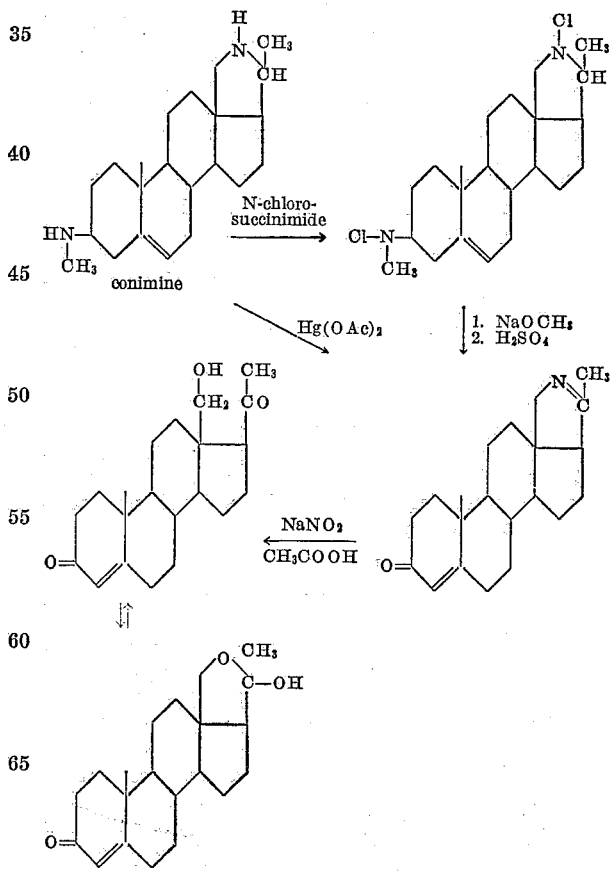

The final products are saturated or unsaturated 18:20-oxido-20-hydroxy-pregnane compounds containing in 3-position a free or functionally converted hydroxyl or oxo group, as well as their functional derivatives or their oxidation products, for example the progestative $\Delta^4$-3-oxo-18:20-oxido-20-hydroxy-pregnene and its oxidation products, that is to say 18-oxo-progesterone and progesterone-18-acid, and functional derivatives of the compounds mentioned. They are biologically active or can be converted into biologically active compounds.

Among the new starting materials and intermediates there should be mentioned in the first place: N-halides of 18:20-imino-pregnane compounds, such as N-halides of 3$\beta$-hydroxy-18:20-imino-allopregnanes, N:N-dihalides, for example the N:N-dichloride of $\Delta^5$-3$\beta$-methylamino-18:20-imino-pregnene, $\Delta^{20:N}$-18:20-imino-pregnenes, for example $\Delta^{20:N}$ - 3$\beta$ - hydroxy - 18:20 - imino - pregnene and $\Delta^{4:20:N}$-3-oxo-pregnadiene.

The present invention covers also any variant of the present process in which only some of the process steps are carried out, or an intermediate obtained at any stage of the process is used as starting material, and the remaining step or steps are carried out.

The following examples illustrate the invention:

Example 1

229 mg. of $\Delta^{4:20:N}$-3-oxo-18:20-imino-pregnadiene (M.P. 176–182° C.) are dissolved in 6 cc. of glacial acetic acid and 20 cc. of water, and while cooling with ice, this solution is treated dropwise with a solution of 600 mg. of sodium nitrite in 10 cc. of water. After having been kept for 4 hours at room temperature, the mixture is carefully extracted with ether. The ethereal extract is repeatedly washed with dilute sulfuric acid, with saturated sodium bicarbonate solution and finally with water, and then evaporated, to yield 216 mg. of a nitrogen-free, slightly yellowish oil which is purified by careful chromatography over a column of 6 grams of alumina (activity II). 350 cc. of a 1:1 mixture of petroleum ether and benzene elute a total of 131 mg. of a colorless oil. Ultraviolet absorption spectrum: Maximum at 242 m$\mu$ (log $\epsilon$=4.2). Infrared absorption spectrum: band at 1700 cm.$^{-1}$ or, respectively, a doublet at 1683/1643 cm.$^{-1}$. These eluates, which are slightly unsaturated towards tetranitromethane have not yet been more closely investigated.

After elution of another 24 mg. of substance with 150 cc. of benzene—which is probably identical with the preceding compound—the column yields on elution with 200 cc. of a 1:1 mixture of ether and benzene and with 100 cc. of ether a total of 38 mg. of crystals melting at 143–145° C. which, after having been recrystallized three times from acetone+petroleum ether, melt sharply and constantly at 153° C. This nitrogen-free compound is saturated towards tetranitromethane and displays in the ultraviolet absorption spectrum a maximum at 242 m$\mu$ (log $\epsilon$=4.16). The infrared spectrum contains bands at 3550, 1665 and 1615 cm.$^{-1}$. The product is $\Delta^4$-3-oxo-18:20-oxido-20-hydroxy-pregnene, or 18-hydroxy-progesterone respectively, which is oxidized by chromic acid-pyridine to 18-oxo-progesterone.

Example 2

The starting material used in Example 1 can be prepared in the following manner:

6.0 grams of crude conessine (M.P. 103–120° C.) are dissolved in 100 cc. of absolute ether and 100 cc. of ethyl acetate and treated at 0 to 4° C., while being stirred well, dropwise in the course of 60 minutes with a solution of 9 grams of bromocyanogen in 200 cc. of absolute ether. While adding the bromocyanogen, a weak current of nitrogen is passed through the solution. The reaction mixture is stirred for 2 hours at 0 to 4° C. and then for 18 hours at room temperature, and then worked up in the following manner: The reaction mixture is diluted with an equal volume of ethyl acetate, treated with a large quantity of water, and the solution is thoroughly washed several times with water. When the organic phase is agitated with dilute sulfuric acid, it yields only traces of basic products. Evaporation of the solvent yields 5.7 grams of neutral products (about 90% of theory) which are dissolved in benzene and filtered through a column of 120 grams of alumina (activity II). The combined benzene eluates are crystallized once from acetone+ether to yield 3.53 grams of crystals melting at 170–171° C. Optical rotation: $[\alpha]_D$=+65° (c.=1.12 in chloroform). The infrared absorption spectrum (in chloroform) contains a strong band of the two cyano groups at 2215 cm.$^{-1}$. The product is N:N'-dicyano-conimine.

500 mg. of N:N'-dicyano-conimine are heated with 30 cc. of ethanolic potassium hydroxide solution of 20% strength (9 parts of ethanol+1 part of water) for 24 hours at 100° C. in a closed tube. The solvent is then evaporated in vacuo as far as possible, and the basic hydrolysis products (410 mg.) are isolated and purified by being dissolved in a small quantity of benzene and filtered through a column of 12 grams of neutral alumina (activity II). A quantitative yield is thus obtained of crude conimine melting at 124–125° C.; its pure form obtained by sublimation in a high vacuum at 100° C. melts at 131–132° C. Optical rotation $[\alpha]_D$=−29° (c.=1.03 in chloroform).

For conversion of conimine into N:N'-dichloro-conimine 230 mg. thereof are dissolved in 50 cc. of absolute ether and while being cooled treated portionwise with 190 mg. of finely powdered N-chlorosuccinimide. The reaction mixture is then stirred for 2 hours at 15–20° C. and then for 2 hours at 30° C.; the solvent is evaporated in the cold in vacuo, the residue is treated with water, and the dichloride is extracted with ether. From the ethereal solution the unreacted basic constituents are separated with ice-cold aqueous tartaric acid solution of 10% strength, to yield 325 mg. of N:N'-dichloro-conimine which decomposes on being heated above 115° C. Optical rotation $[\alpha]_D$=+29° (c.=0.67 in chloroform).

To convert N:N'-dichloro-conimine into $\Delta^{4:20:N}$-3-oxo-18:20-imino-pregnadiene, 222 mg. thereof are dissolved in 20 cc. of absolute methanol and a solution of sodium methylate (prepared by dissolving 250 mg. of sodium in 2 cc. of absolute methanol) is added. The mixture is then refluxed for 1 hour under nitrogen, the solution is extensively concentrated in vacuo at room temperature, treated with water, and the precipitate is extracted with ether, to yield 190 to 195 mg. of halogen-free reaction products. While cooling with ice, $\Delta^{4:20:N}$-3-imino-18:20-imino-pregnadiene is dissolved in 70 cc. of N-sulfuric acid, and the mixture is kept for 20 hours at room temperature. The reaction product is then resolved into its neutral (5 mg.) and basic (160 mg.) constituents. The bases are dissolved in a small amount of benzene and filtered through a column of 1.6 grams of neutral alumina (activity II), whereby 104 mg. of slightly yellowish crystals are obtained which are purified by being once more carefully chromatographed over a column of 5.5 grams of alumina (neutral; activity II). A 3:7 mixture of petroleum ether+benzene elutes a total of 64 mg. of colorless crystals melting at 165–166° C. which, after having been recrystallized three times from acetone+petroleum ether, have a constant melting point of 181–182° C. Optical rotation $[\alpha]_D$=+84° (c.=0.71 in chloroform). Ultraviolet absorption spectrum: Maximum at 240 m$\mu$ (log $\epsilon$=4.21). Infrared spectrum: Bands at 1673, 1650, 1619 cm.$^{-1}$ (in potassium bromide). The product is $\Delta^{4:20:N}$-3-oxo-18:20-imino-pregnadiene of $p_K$=5.80 (Cellosolve); its oxime melts at 139–140° C. Ultraviolet absorption spectrum: Maximum at 242 m$\mu$ (log $\epsilon$=4.185).

What is claimed is:

1. Process for the manufacture of 18-hydroxy-20-oxopregnanes, wherein a Δ²⁰:ᴺ-18:20-imino-pregnene compound is treated with nitrous acid.

2. Process as claimed in claim 1, wherein the starting material is treated with sodium nitrite in an acetic acid solution.

3. Process for the manufacture of 18-oxygenated pregnanes, wherein a Δ²⁰:ᴺ-18:20-imino-pregnene compound is treated with nitrous acid and subsequently with a member selected from the group consisting of a hexavalent chromium compound, a heptavalent manganese compound and a ketone together with a tertiary butylate.

4. Process as claimed in claim 3, wherein Δ⁴-3-oxo-18:20-oxido-20-hydroxy-pregnene is oxidized with chromic acid-pyridine.

5. Process as claimed in claim 4, wherein Δ⁴-3-oxo-18:20-oxido-20-hydroxy-pregnene is oxidized with potassium permanganate.

6. Process as claimed in claim 1, wherein Δ⁴:²⁰:ᴺ-3-oxo-18:20-imino pregnadiene is used as starting material.

7. The N:N-dichloride of Δ⁵-3β-methylamino-18:20-imino-pregnene.

8. Process for the manufacture of Δ²⁰:ᴺ-18:20-imino-pregnenes, wherein 18:20-imino-pregnanes are reacted with an N-halogenated carboxylic acid amide and the product obtained is treated with a base.

9. Process for the manufacture of Δ²⁰:ᴺ-18:20-imino-pregnenes, wherein 18:20-imino-pregnanes are reacted with mercury acetate.

10. The Δ⁴:²⁰:ᴺ-18:20-imino-3-oxo-pregnadiene.

11. A member selected from the group consisting of compounds having the formula

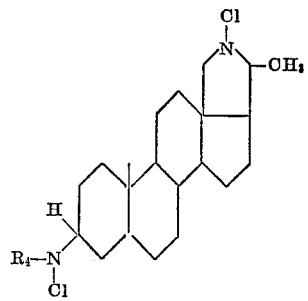

in which $R_4$ stands for lower alkyl and their derivatives which contain a double bond in the 5:6-position.

12. The Δ²⁰:ᴺ-18:20-imino-3β-hydroxy-pregnene.

References Cited in the file of this patent

UNITED STATES PATENTS

| 2,907,758 | Pappo | Oct. 6, 1959 |
| 2,911,404 | Pappo | Nov. 3, 1959 |
| 3,007,922 | Georgian et al. | Nov. 7, 1961 |

OTHER REFERENCES

Buzzetti et al., Helv. Chim. Acta, vol. 42, pp. 388–390, Feb. 1, 1959.